(12) United States Patent
Novosat

(10) Patent No.: US 6,851,943 B1
(45) Date of Patent: Feb. 8, 2005

(54) CONTINUOUS THERMOFORMING MACHINE

(75) Inventor: William Brett Novosat, Mechanicsburg, PA (US)

(73) Assignee: L. L. Brown, Inc., Enola, PA (US)

( * ) Notice: Subject to any disclaimer, the term of this patent is extended or adjusted under 35 U.S.C. 154(b) by 417 days.

(21) Appl. No.: 10/052,587

(22) Filed: Jan. 17, 2002

(51) Int. Cl.[7] .............................................. B29C 43/22
(52) U.S. Cl. ................... 425/193; 425/387.1; 425/388; 425/DIG. 47
(58) Field of Search ........................... 425/302.1, 307, 425/193, 122, 387.1, 388, 398, DIG. 48, DIG. 47; 264/297.5

(56) References Cited

U.S. PATENT DOCUMENTS

| | | | |
|---|---|---|---|
| 3,166,790 A | | 1/1965 | Keyes .......................... 18/19 |
| 3,988,093 A | | 10/1976 | Birchenough ............. 425/174.4 |
| 4,009,981 A | * | 3/1977 | Rosen ........................ 425/388 |
| 4,284,396 A | | 8/1981 | Thissen et al. .......... 425/342.1 |
| 4,504,205 A | * | 3/1985 | Stofko ........................ 425/181 |
| 4,536,148 A | * | 8/1985 | Murley et al. ........... 425/387.1 |

FOREIGN PATENT DOCUMENTS

JP          404282224 A    * 10/1992

OTHER PUBLICATIONS

Edward D. Segen & Co., "Thermoform Tooling, Components, Accessories & Services", 2nd Edition, p. 13.
General Electric Company, "GE Engineering Thermoplastics Thermoforming Processing Guide", copyright 2000, 51 pages; p. 27 discusses continuous thermoforming machines.

* cited by examiner

Primary Examiner—Robert Davis
Assistant Examiner—Joseph S. Del Sole
(74) Attorney, Agent, or Firm—Hooker & Habib, P. C.

(57) ABSTRACT

A pressure box for thermoforming a heated sleet of thermoforming material against a mold includes a top plate, side plates, a downstream and plate and an upstream end plate. Each end plate includes a pair of plate members that define a slot open to the bottom of the end plate. A sheet strip of elastomeric material is mechanically held in the slot and extends below the end wall to a seal surface. The seal surface is laser cut to closely conform with the three-dimensional shape of the mold.

15 Claims, 7 Drawing Sheets

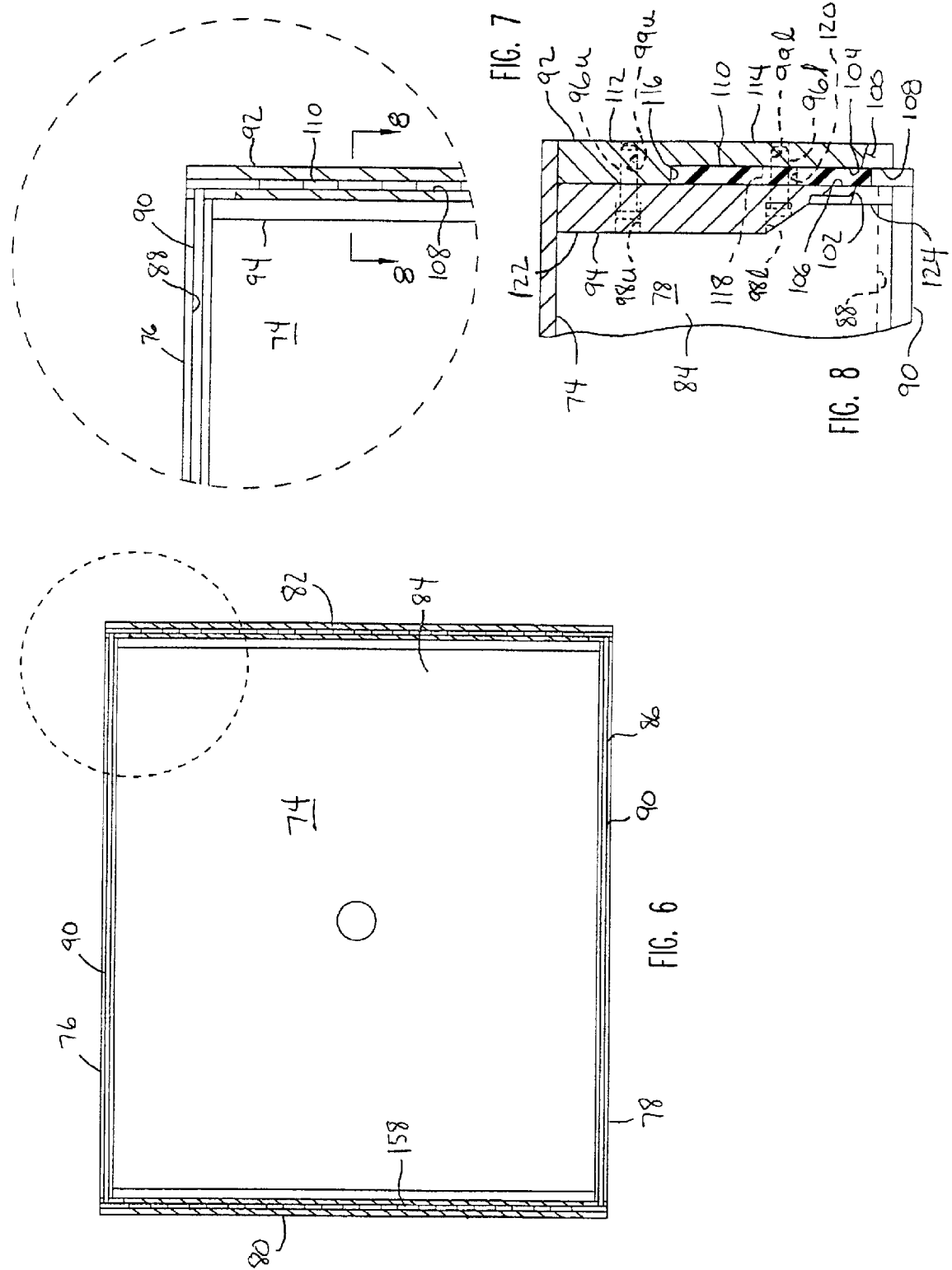

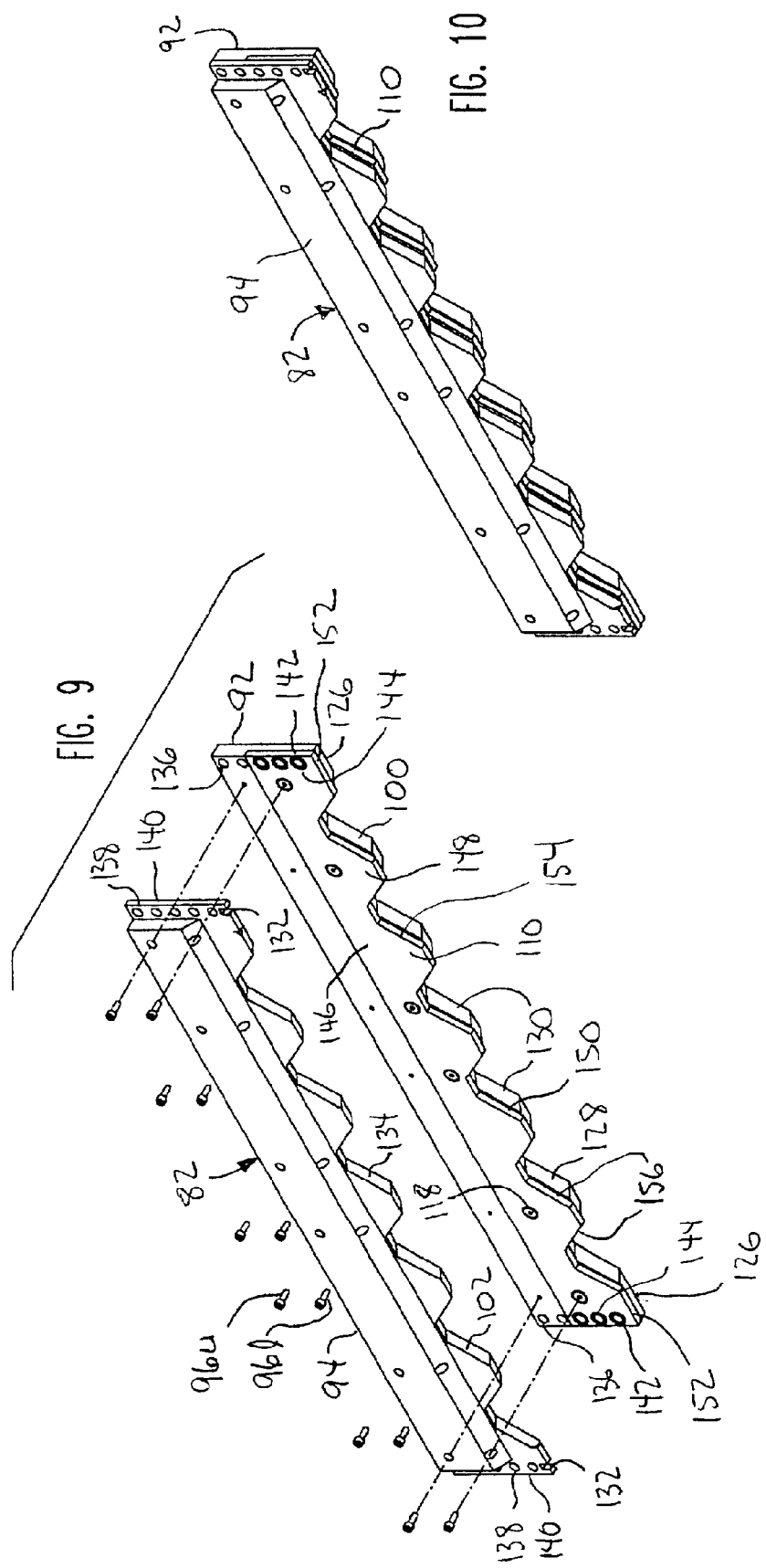

_US 6,851,943 B1_

CONTINUOUS THERMOFORMING MACHINE

FIELD OF THE INVENTION

The invention relates generally to thermoforming, and more particularly, to a pressure box for thermoforming a seamless product in a continuous thermoforming machine.

DESCRIPTION OF THE PRIOR ART

Thermoforming is a process that uses heat and pressure to mold plastic sheet or film and form a finished product. The plastic sheet is heated above its softening temperature whereby the sheet becomes flexible and can be stretched into a desired shape.

The heated sheet is placed over a mold whose upper face has male and/or female portions that define the desired three-dimensional shape of the molded product. Pressurized air in a pressure box above the sheet presses the sheet against the mold. Vacuum is applied to the surface of the sheet through the mold. The pressure and vacuum pushes and pulls the sheet against the mold. The hot sheet stretches and takes the shape of the mold.

The molded plastic sheet cools below its softening temperature, stiffens and retains its molded shape. The mold and pressure box separate and enable the molded plastic to be removed from the mold for further cooling and subsequent processing.

A continuous thermoforming machine performs the thermoforming process on a continuous length of plastic sheet. The sheet is indexed horizontally through the machine. Work stations are sequentially arranged along the machine heating, molding and cooling the sheet. Operations are performed on portions of the stationary sheet at each workstation.

In a conventional thermoforming process the heated sheet is molded at a molding station. The molding station includes a rectangular pressure box that seals the plastic against a frame surrounding the molding surface. Each side of the pressure box carries a resilient gasket portion that compresses the plastic sheet against the frame. Each gasket portion presses against the flat outer edge of the mold and is uniformly compressed along the length of the mold.

The seals on the upstream and downstream sides of the mold extend across the width of the sheet. The seals form seams across the sheet when compressing the sheet. The sheet is indexed downstream a distance equal to the length of the mold so that the upstream seam is moved downstream past the mold. As a result, the seams separate the molded sheet portions from each other. This is suitable for producing molded products such as plastic blister packs or cups where length of the molded part is less than the length of the mold.

Seamless continuous thermoforming forms a continuous molded product having a length greater than the length of the mold. In the seamless thermoforming process, the pressure box includes upstream and downstream sides that overlie the ends of the mold. These sides of the box each carry a resilient, three-dimensional gasket that presses against the mold itself to seal the plastic. This avoids forming flat seams between the molded portions of the sheet. The sheet is indexed a distance less than the length of the mold so that the upstream end of the molded plastic is placed over a downstream end of the mold. The mold pattern repeats and enables the upstream end of the molded plastic to fit and seal against the downstream end of the mold in the next operating cycle. The plastic sheet is molded to form a product extending continuously between two or more adjacent molded sheet portions.

The gaskets that overlie the ends of the mold substantially conform to the three-dimensional shape of the mold. This enables the gaskets to seal the hot plastic against the mold and seal the pressure box against the plastic. In one known type of pressure box flowable elastomer is extruded onto the bottom contours of the pressure box to form gaskets. Each gasket is sufficiently thick to deform and conform to the shape of the mold. However, the gaskets are not uniformly compressed. The highly compressed portions of the gaskets fail quickly and limit gasket life. Furthermore, the overpressure applied against the gaskets causes the adhesive connections to the box to fail. The gaskets shear or peel away from the bottom of the pressure box. Production is lost because the machine must be stopped to replace failed gaskets.

To increase the life of the gaskets for seamless thermoforming, it is known to shape the lower ends of the pressure box. The ends are shaped to substantially conform with the three dimensional shape of the mold. The gaskets are attached to the conforming end surfaces by adhesive and take the shape of the mold. Although each gasket is more uniformly compressed against the mold, gasket life remains undesirably short. The applied overpressure still causes the caskets to fail and shear or peel from the sides of the pressure box.

Thus there is a need for an improved pressure box for use in seamless continuous thermoforming. Gaskets sealing the three-dimensional mold portions should be more reliably attached to the sides of the pressure box for increased life and greater productivity. Worn gaskets should be easily replaced. The upstream and downstream sides of the pressure box should be easily interchangeable for use with molds defining differently shaped products.

SUMMARY OF THE INVENTION

The present invention is directed to an improved pressure box for thermoforming molded articles. The improved pressure box has sealing members or gaskets mechanically held in one or more sides of the pressure box for increased life and greater productivity. Worn sealing members are easily replaced. The sides of the pressure box can be easily interchanged for use with molds defining differently shaped products.

A pressure box having features of one aspect of the present invention includes a top plate, and side and end plates extending downwardly below the top plate. The top plate, the side plates and the end plates define a pressure chamber open at the bottom of the pressure box. A resilient circumferential seal is on the bottom of the pressure box, the seal extending around the pressure chamber to form a seal when the pressure box is pressed against a heated sheet for thermoforming the sheet.

At least one of the side plates and the end plates includes a pair of walls defining an essentially uniform width slot open at the lower end of such plate. The slot extends along the length of the plate. A resilient sealing member is in the slot and extends downwardly below the lower end of the plate. The sealing member includes an end surface below the lower end of the plate, the end surface forming a part of the seal.

A number of retaining members extend from one or both of the walls into the slot. The retaining members extend through holes in the sealing member to engage the sealing member and resist movement of the sealing member out of the slot. The retaining members mechanically hold the sealing member in the slot and resist blow out of the sealing member. The sealing member cannot simply peel or shear away from the side of the pressure box and so the operating life of the sealing member is increased for greater productivity.

The plate having the slot is preferably detachably mounted to the other plates. This enables the plate to be interchanged with other plates configured for use with molds defining differently shaped products.

In preferred embodiments of the present invention the sealing member is a strip sheet of elastomeric material. The strip is preferably laser cut from a silicone rubber sheet. The bottom surface of the strip sheet can be cut to closely conform with the three-dimensional shape of the mold.

In yet other preferred embodiments of the present invention the plate having the slot includes first and second plate members. The plate members are detachably held together to enable the plate members to be easily separated for replacing worn sealing members.

Other objects and features of the invention will become apparent as the description proceeds, especially when taken in conjunction with the accompanying drawings illustrating the invention, of which there are seven sheets of one embodiment.

DESCRIPTION OF THE DRAWINGS

FIG. 6 is a view taken generally along line 6—6 of FIG. 1D and illustrating the pressure box of the thermoforming machine shown in FIG. 1A;

FIG. 7 is an enlarged view of a lateral side plate and the downstream end plate at one corner of the pressure box circled in FIG. 6;

FIG. 8 is a partial sectional view of the end plate and gasket held in the end plate taken along line 8—8 of FIG. 7;

FIG. 9 is a perspective view of the end plate and gasket shown in FIG. 8, the end plate partially unassembled;

FIG. 10 is a perspective view of the assembled end plate and gasket shown in FIG. 9;

DESCRIPTION OF THE PREFERRED EMBODIMENT

Figure 1A:
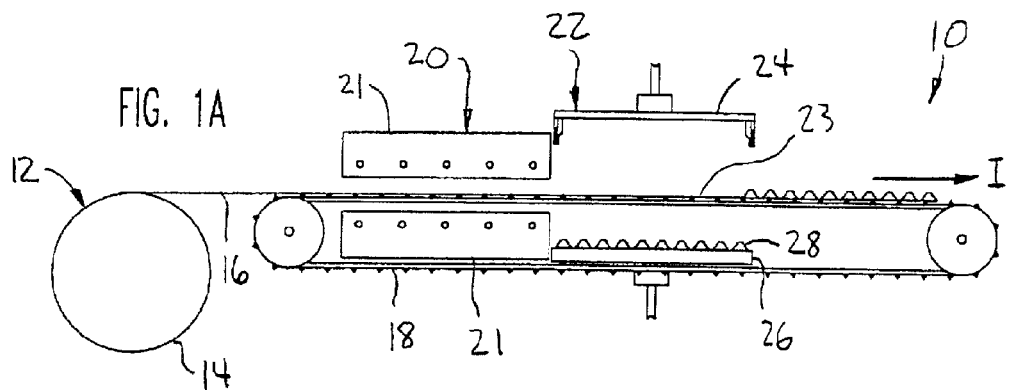
FIGS. 1A–1D are schematic views, partially broken away, of forming a seamless thermoformed product using a continuous thermoforming machine according to the present invention.

FIGS. 1A–1D illustrate molding a seamless thermoformed product using a continuous thermoforming machine 10 in accordance with the present invention. The thermoforming machine 10 includes a material supply station 12 that holds a continuous roll of thermoforming material 14, preferably plastic. A web of unformed plastic sheet 16 is unrolled from the roll 14 and received on a pair of conventional pin conveyors 18 (shown only in FIG. 1A) located on each side of the sheet 16. The pin conveyors pierce the edges of the sheet and pull the sheet forward along a straight line in a downstream indexing direction indicates by the arrow "I", see FIG. 1A.

Work stations (described below) are sequentially arranged along the pin conveyors 18 to thermoform the unrolled sheet. The pin conveyors index the sheet a preset distance along the indexing direction to move the sheet to and from each work station. The conveyors then stop a preset time or operations to be performed or the sheet simultaneously at each workstation.

The unrolled sheet 16 is first fed to a heating station 20 where the sheet is positioned between a pair of radiant heaters 21, a see FIG. 1A. The heaters heat the sheet above its softening temperature. The sheet is then indexed from the heating station 20 to a molding station 22 for forming. At the molding station 22 the heated sheet portion 23 is positioned between a pressure box 24 and mold 26. The upper face 28 of the mold 26 defines a three-dimensional mold pattern to be thermoformed in the sheet.

Figure 1B:
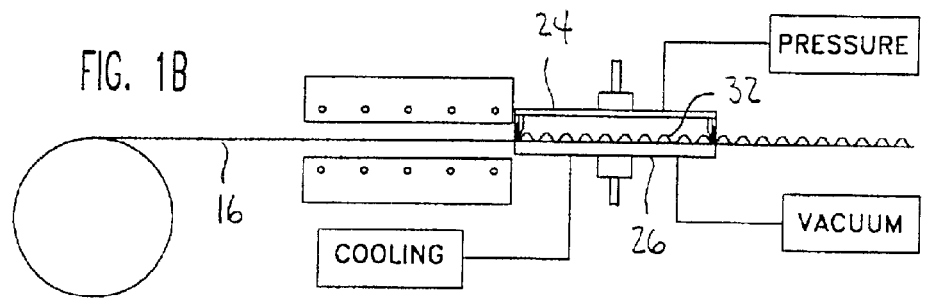

As shown in FIG. 1B, the pressure box 24 is lowered and the mold 26 rises to sandwich the sheet portion 23 between them. The pressure box 24 and the mold 26 form an airtight seal around an interior perimeter of the sheet. A vacuum is applied to the mold 26, and optionally air pressure is applied to the pressure box 24. The differential pressure forces the heated sheet against the upper face of the mold to form a molded sheet portion 32. The molded sheet takes the three-dimensional shape defined by the mold. The mold 26 is cooled to cool the molded plastic below its softening temperature so that the sheet retains the molded shape. The pin conveyors 18 hold the edges of the sheet and cooperate with the pressure box 24 and the mold 26 to resist deformation of the sheet outside of the sealed perimeter.

The pressure box 24 and the mold 26 separate to free the newly molded sheet portion 32. See FIG. 1C. The sheet portion 32 extends continuously and without a seam from previously molded sheet portion 34. The molded sheet portion 32 is then indexed from the molding station 22 to a cooling station 36, see FIG. 1D, and then onto a trimming station (not shown) where the molded sheet is trimmed and cut to a desired length.

Figure 2:
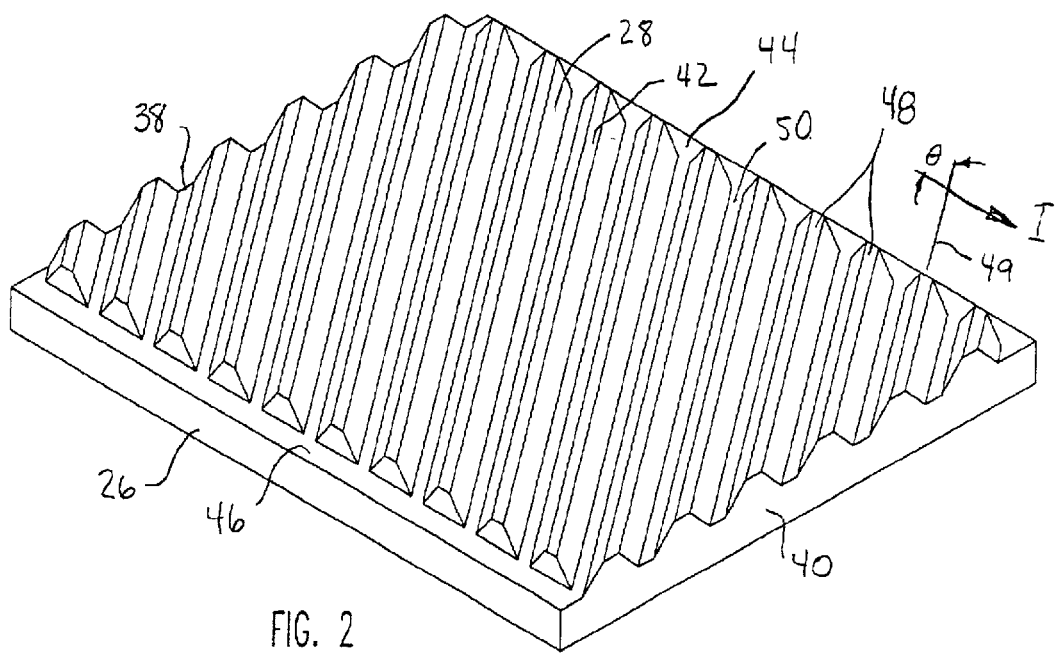
FIG. 2 is a perspective view of the mold used in the machine shown in FIG. 1.

FIG. 2 illustrates the mold 26. The mold 26 is conventional and is illustrative of a three-dimensional mold used in continuous thermoforming. The mold 26 includes an upstream end 38 adjacent the heating station 20 and a downstream end 40 adjacent the cooling station 36. The upper face 28 of the mold 26 has a three-dimensional mold pattern 42 that extends between flat mold borders 44, 46. In the illustrated embodiment the three-dimension mold pattern 42 is formed from rows of convex or male projections 48 spaced across the entire length of the mold face 28. Each projection 48 extends along an axis 49 oriented at an acute angle θ with respect to the indexing direction. The projections extend from a flat base 50 that is co-planar with the borders 44, 46.

Figure 3:
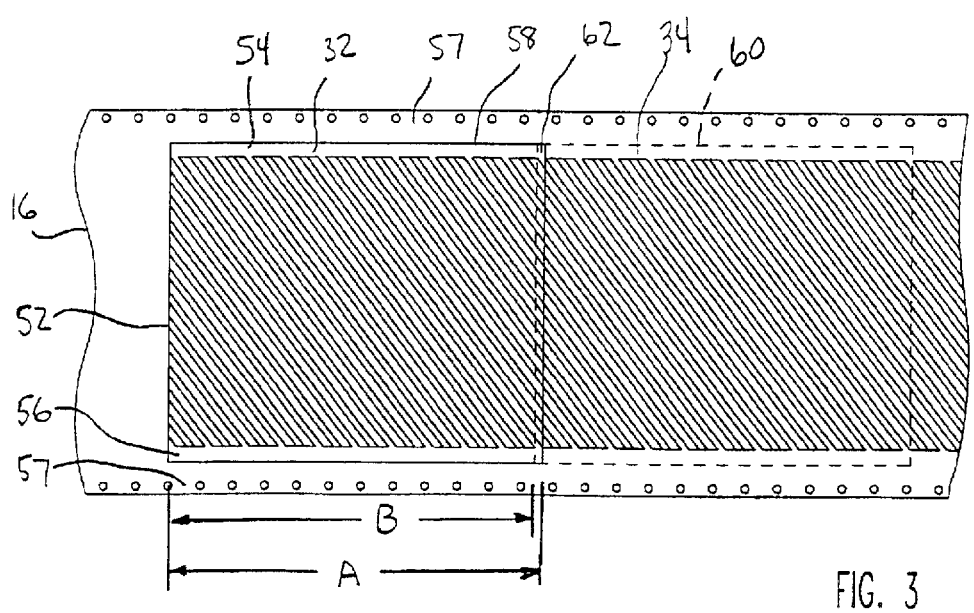
FIG. 3 is a view of a seamlessly molded sheet formed using the mold shown in FIG. 2.

FIG. 3 illustrates the seamless molding of adjacent sheet portions. The heated sheet has been urged by the differential pressure against the upper mold face 28 and cooled to form the molded sheet portion 32. The heated sheet takes the shape of the mold face 28, with the three-dimensional mold pattern 42 defining a three-dimensional molded pattern 52 in the newly molded plastic. The plastic sheet against the mold borders form flat molded sides 54, 56. The pin conveyors 18 pierce outer unmolded edges 57 of the sheet 16 to pull the sheet.

A rectangle representing she outer perimeter 58 of the newly molded sheet portion 32, corresponding to the outer perimeter of the mold 26, is shown in solid lines. A rectangle representing the corresponding perimeter 60 of the previously molded sheet portion 34 is shown in dashed lines. A length "AA" represents the length of the molded sheet portion 32 in the indexing direction.

The pin conveyors 18 index the sheet 16 a distance "B" less than the length "A". When the previously molded plastic 34 was indexed from the molding station 22 in the prior operating step, the upstream end 62 of the previously molded plastic 34 partially remains in the molding station 22. The molded end 62 overlaps the downstream end of the mold 26 and enables the machine 10 to form a molded product extending seamlessly along the length of the sheet 16 and including the adjacent molded sheet portions 32, 34.

When molding the sheet portion 32, the downstream end of the mold 26 fits in the previously molded plastic 62. The downstream end of the mold face 28 closely conforms to the shape of the end plastic 62 so that the previously molded plastic can be pressed against the mold to form a seal.

Figure 1C:
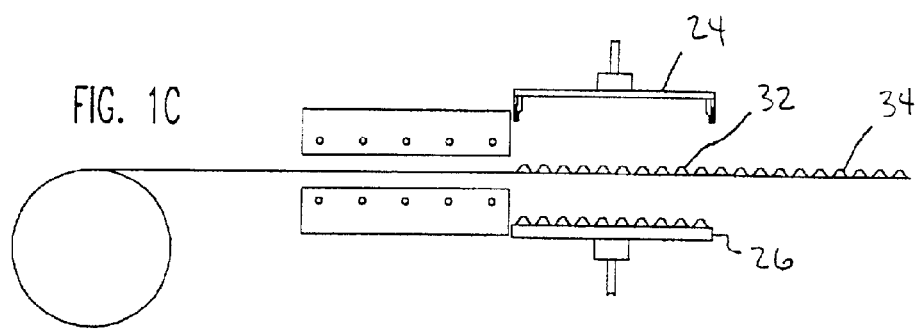
Figure 1D:
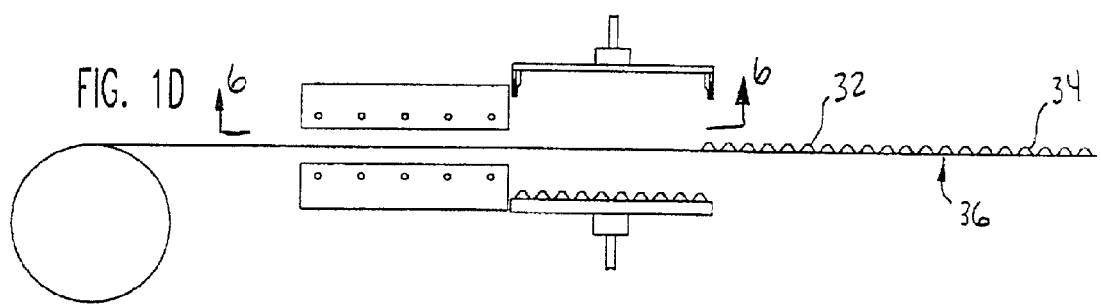
Figure 4:
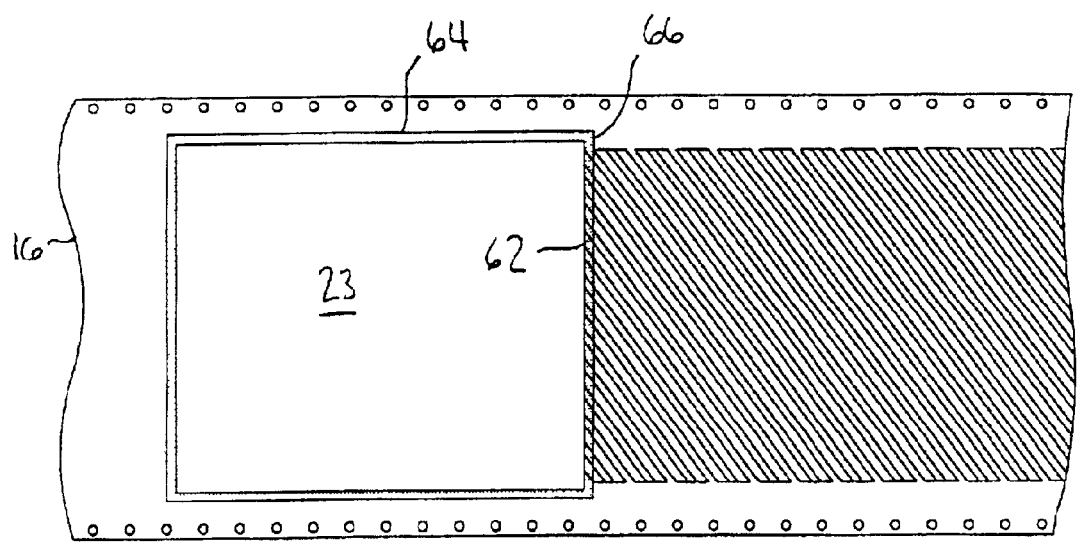
FIGS. 4 and 5 are views of the sheet shown in FIG. 3 being molded by the machine shown in FIGS. 1A—D.
Figure 5:
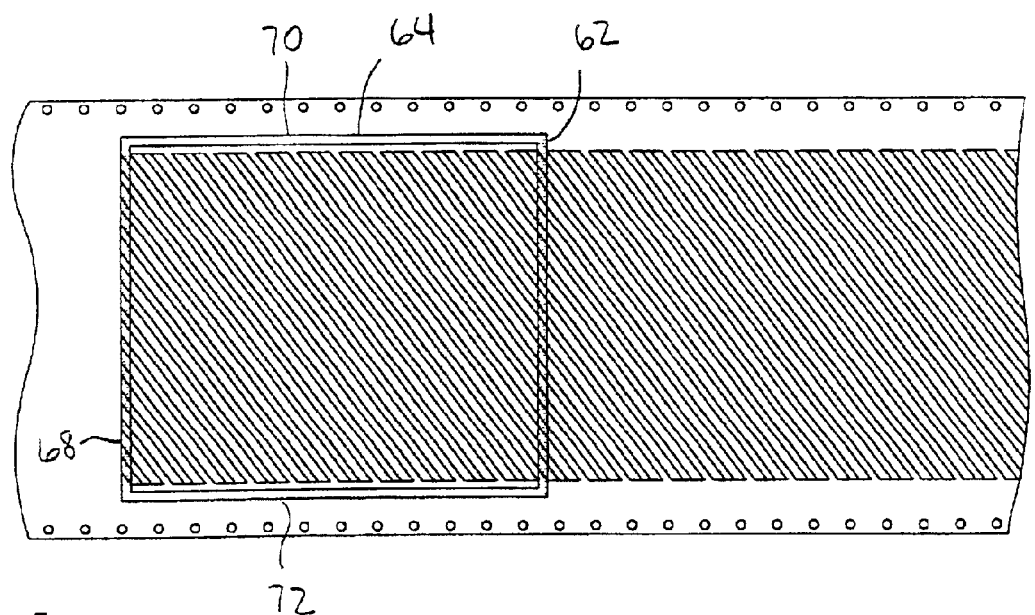

FIGS. 4 ard 5 illustrate thermoforming the heated sheet portion 23 in the molding station 22 as shown in FIG. 1C. The lower end of the pressure box 24 presses against the upper face 28 of the mold 26 to sandwich the sheet 16 between them. The pressure box 24 and the mold 26 cooperate to form a generally rectangular sealed perimeter 64 on both sides of the sheet 16. The sealed perimeter 64 is represented in FIGS. 4 and 5 by a shaded rectangle. The width of the perimeter 64 has been exaggerated for clarity. It should be understood that the ups-ream and downstream sides of the perimeter 64 are spaced a predetermined amount inwardly from the ends of the mold 26.

FIG. 4 illustrates the sealed perimeter 64 prior to the application of differential pressure to the heated sheet portion 23. Deformation of the heated sheet 23 other than the premolded end 62 is not shown. The sealed perimeter 64 includes a downstream side 66 extending along the previously molded plastic 62. The shape of the lower end of the pressure box 24 forming the downstream seal 66 substantially conforms to the three-dimensional shape of the downstream end of the mold face 28 to sealingly sandwich the molded end 62 of the sheet between them.

FIG. 5 illustrates the sealing perimeter 64 after differential pressure has been applied to the heated sheet 23. The sealed perimeter 64 includes an upstream side 68 extending along the upstream end of the mold 26. The shape of the lower end of the pressure box 24 forming the upstream seal 66 substantially conforms to the three-dimensional shape of the upstream end of the mold 26 to deform and sealingly sandwich the heated sheet 23 between them.

The sealing perimeter 64 also includes sides 70 and 72 that extend parallel with the index direction and along the flat mold borders 44 and 46. The shape of the lower end of the pressure box 24 forming the seals 70 and 72 is flat to conform to the shape of the flat mold borders 44 and 46.

The mold 26 defines a mold pattern that repeats in the indexing direction along the upper mold face 28. The pattern repeat enables the shape of the mold face at the downstream end of the mold 26 to be a repeat of the shape of the mold face at the upstream end of the mold. The mold 26 has a conventional design in that the shape at the downstream end of the mold is repeated at the upstream end of the mold.

Other molds used with the machine 10 may have different repeat spacing. In such embodiments the index distance "B" would be less than the distance shown in FIG. 2. The upstream side of the pressure box 24 would be spaced more inwardly from the upstream end as needed. The relationship between the mold repeat spacing and the index distance to form a seamless molded product is known and will not be described in further detail.

FIGS. 6–8 illustrate the pressure box 24. Conventional structure for introducing pressurized air into the pressure box is omitted from the drawings. A horizontal top plate 74 is located or an upper end of the pressure box. Pairs of opposed side plates 76, 78, an upstream end plate 80 and a downstream end plate 82 extend downwardly below the top plate 74. The plates are preferably made from aluminum for high thermal conductivity.

The side and end plates define a pressure chamber 84 open at the bottom of the pressure box 24. A resilient circumferential seal 86 is on the bottom of the pressure box, the seal 86 extending around the pressure chamber to form a seal when the pressure box is pressed against a heated sheet for thermoforming the sheet.

Side plates 76, 78 face the mold borders 44, 46 respectively to form the seals 70, 72 when the pressure box 24 is pressed against the mold 26. Each side plate 76 or 78 is rectangularly shaped and includes a center slot 88 on the lower end of the plate. The slot 88 extends the length of the plate and retains a conventional resilient gasket 90 that forms a part of the seal 86. The gasket 90 has a flat bottom sealing surface to conform with the mold border 44 or 46 and is held in the slot 88 in a conventional manner. Preferably the gasket 90 is a length of silicon rubber extruded "H" cord available as Catalog No. PDECH316 from Edward D. Segen & Co., Inc., 11 Kent Street, Milford Conn. 06460 or equivalent. As best seen in FIG. 7, the gasket 90 extends outwardly from the ends of the side plate to abut resilient gaskets held by the end plates 80, 82 as will be described in greater detail below.

End plates 80, 82 face the upstream and downstream ends of the mold 26 respectively to form the seals 66, 68 when the pressure box 24 is pressed against the mold 26. Each end plate 80, 82 extends perpendicularly to the indexing direction and overlies the upstream and downstream ends of the mold 26 respectively. The end plates 80, 82 are of generally similar construction so only the downstream end plate 82 will be described in detail.

The end plate 82 includes first and second plate members 92 and 94 respectively. The plate members 92, 94 face each other and are rigidly held together by upper and lower sets of screws 96$u$ and 96$l$. The screws extend from the pressure chamber through sets of countersunk holes 98$u$ and 98$l$ in the second plate member 92 and into threaded holes 99$u$ and 99$l$ in the first plate member 94. Each bottom surface 100 and 102 of the first and second plate members respectively has a three-dimensional shape that substantially conforms with the facing shape of the mold 26.

The first and second plate members 92, 94 have facing and spaced apart walls 104, 106 respectively that define between them a slot 108 open at the bottom of the end plate 82. The slot has an essentially uniform width and extends the length of the end plate 82. A flat resilient gasket 110 is located in the slot 108 between the two plate members. See FIG. 8. The gasket 110 forms part of the circumferential seal 86. The width of the slot 108 is preferably slightly greater than the normal thickness of the gasket 110 so that the gasket is normally not compressed between the walls of the slot.

The first plate member 92 has a nominal thickness upper end 112 and a reduced thickness lower end 114 forming the wall 100. A downwardly facing shoulder 116 extends horizontally along the length of she plate member 92 above the wall 104. The gasket 110 abuts the shoulder 116 to locate the gasket in the slot.

The upper set of screws 96u engage the threaded holes 99u located in the upper end of the plate member 92. The lower set of screws 96l extend through the slot 108 through bosses 118 integral with the plate member 92. The bosses 118 are spaced along the length of the slot 108 and aligned with the holes 98l in the second plate member 94. The bosses 118 extend into the slot 108 from the wall 104 through holes 120 in the gasket 110. The screws 96u, 96l detachably hold the plate members together to enable changing of OR, worn gaskets 110.

The second plate member 94 has a nominal thickness upper end 122 and a reduced thickness lower end 124. The holes 98u and 98l are located in the upper end of the second plate member. The lower end includes the bottom surface 102. The side of the second plate member 94 facing the first plate member 92 is flat and defines the wall 102.

FIG. 9 is a view of the disassembled plate members 92 and 94 of the end wall 82. The bottom surface 100 of the first plate member includes flat, horizontal sections 126 that face the flat mold borders 44, 46 and a three-dimensionally shaped section 128 between them that faces the mold three-dimensional pattern 42. The three-dimensional section 128 is shaped to substantially conform with the three-dimensional pattern 42. In the illustrated embodiment, the section 128 includes spaced apart concave-shaped surfaces 130 that substantially conform with the shape of the facing male projections 48 of the mold 26.

The bottom surface 102 of the second plate member 94 is similarly, but not identically, shaped to the bottom surface 100 of the first plate member 92. A pair of rectangularly-shaped notches 132 enable the ends of the gaskets 90 to extend through the plate member 94 and abut the gasket 110. As explained in greater detail below, the three-dimensionally shaped section 134 of the bottom surface 102 does not have the same shape as the three-dimensionally shaped section 128 of the surface 100.

The end slate 82 is attached to the side plates 76 and 78 by mounting screws (not shown). The screws extend from outside the pressure box through vertically aligned through mounting holes 136 and 138 in the plate members 92, 94 respectively. The through holes 138 are located in reduced thickness ends 140 of the second plate member 94 that face the side plates 76 and 78. Some of the screws extend through the slot 102; these screws extend with clearance through bores in bosses 142 aligned with respective holes 136. The bosses 142 are generally similar to the bosses 118 and extend through holes 144 in the gasket 110.

The gasket 110 is a flat sheet strip of elastomeric material, preferably cut from a silicone rubber sheet. The gasket 110 includes an upper mounting end 146 abutting the shoulder 116 and a lower end 148 that is shaped to substantially conform to the shape of the mold 26. The gasket holes 120 are located in the upper end of the gasket.

The bottom of the lower gasket end 148 includes a bottom seal surface 150. In the illustrated embodiment the gasket 110 extends below the bottom of the end wall 82 about 0.020 inches when unstressed so that the seal surface 150 is proud of the bottom of the end plate 82. The seal surface 150 extends horizontally through the thickness of the gasket and is perpendicular to the sides of the gasket sheet. Along the length of the gasket the seal surface 150 is shaped to substantially conform with the mold 26, similar to the bottom surfaces 100, 102 of the plate members 92, 94. In the illustrated embodiment, the seal surface 150 includes flat, horizontal segments 152 and a three-dimensionally shaped section 154 between them. The three-dimensional section 154 is shaped along the length of the surface to substantially conform with the facing three-dimensional pattern of the mold 26 and includes concave-shaped surfaces 156.

The bosses 118 retain the gasket 110 in the slot 108. The bosses 118 form retaining or connecting members whose outer surfaces mechanically hold the gasket 104 in the slot 108. The bosses 142 function the same way to mechanically hold the gasket 110 in the slot.

FIG. 10 illustrates the assembled downstream end wall 82. When attached to the side plates 76, 78 the mounting screws apply a clamping force urging the ends of the end plate 82 against the side plates 76, 78. This resists gapping between the ends of the gaskets 90 held by the side plates and the casket 110 in the end wall 80 when differential pressure is applied to the sheet.

The upstream end plate 80 carries a resilient gasket 158 (see FIG. 6), similar to gasket 110, which gasket forms part of the circumferential seal 86. The bottom surfaces of the end plate 80 and the gasket 158 are shaped to substantially conform to the upstream end of the mold 26.

Operation of the pressure box 24 will now be described. The gaskets 110, 158 are first installed in their associated end plates 82 or 80 prior to use. To install a gasket, the end wall is detached from the side plates 76, 78, disassembled and the plate members separated. The gasket is positioned against the shoulder of the first plate member, with the bosses 118, 142 extending through the corresponding holes 120, 144 in the gasket. The end plate is then re-assembled and re-attached to the side plates.

Figure 11:
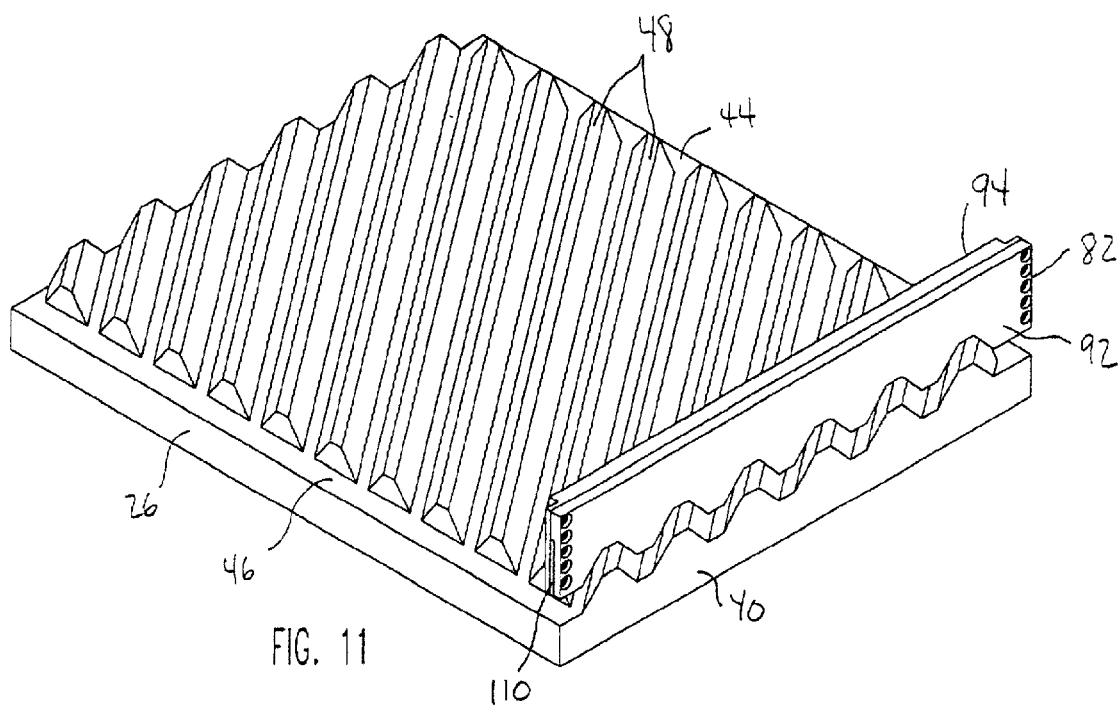
FIG. 11 is a perspective view of the end plate and gasket shown in FIG. 8 and the mold shown in FIG. 2 prior to the pressure box engaging the mold.

FIG. 11 illustrates the relative position of the downstream end plate 82 overlying the downstream end 40 of the mold 26 prior to the molding step shown in FIG. 1B. For clarity, the sheet 16 is not shown. The first plate member 92 is aligned with the downstream end of the mold 26. The gasket 110 and the second plate member 94 are spaced inwardly from the end of the mold 26 as shown. The concave-shaped bottom surfaces of the end plate members 92, 94 and the gasket 110 face the corresponding male projections 48 of the mold 26. It is understood that the upstream side end plate 80 overlies the upstream end of the mold 26 in a similar manner and that the side plates 76, 78 overlie the flat mold borders 44 and 46.

The heated sheet portion 23 (not shown in FIG. 11) is in the molding station 22 between the pressure box 24 and the mold 26. As the pressure plate 24 and the mold 26 come together, the premolded plastic 62 and the male mold projections 44 are received into the corresponding concave seal surfaces 156 of the gasket 110. Similarly, male mold projections 48 are received in the concave seal segments of the gasket 158 held in the upstream end plate 80.

Figure 12:
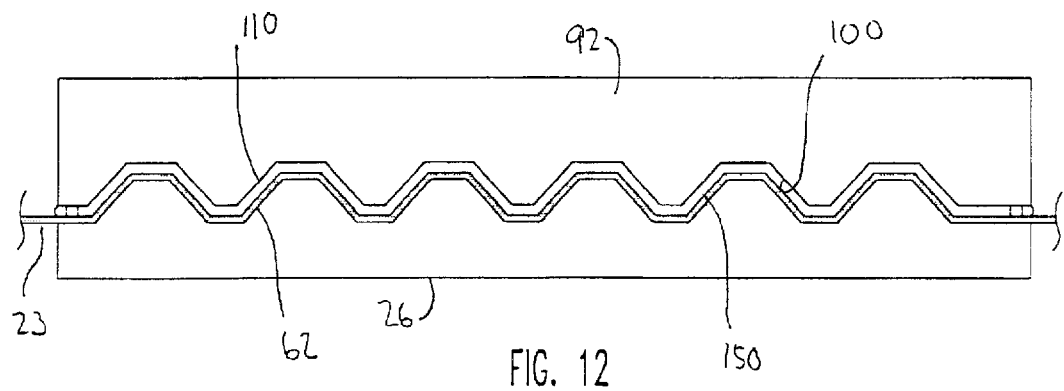
FIG. 12 is an end view of the end plate, gasket and mold shown in FIG. 11 after a web of thermoforming material is sandwiched between the pressure box and the mold.

The pressure box 24 is further lowered and pressed against the mold 26 to sandwich the heated sheet portion 23 between them prior to molding the sheet. See FIG. 12, in which the thickness of the sheet portion 23 and the distance the gasket 110 extends below the end plate 82 are exaggerated for clarity. The gasket 110 is elastically compressed and presses the previously molded plastic 62 against the mold 26.

The gasket seal surface 150 forms an airtight seal against the molded plastic 62. The seal ex-ends along the downstream end of the mold 26 and forms the upper side of the perimeter seal side 66. Similarly, the gasket 158 pushes the heated sheet 23 against the upstream end of the mold 26 and forms the upper side of the perimeter seal side 68. The flat caskets 90 press the heated plastic against the flat mold borders 44, 46 and seal the plastic in a conventional manner.

The gasket seal surface 150 closely conforms to the shape of the mold such that the gasket 110 is compressed substantially uniformly along its length. The compression of the gasket 110 preferably causes the sides of the gasket 110 so engage the facing slot walls 100, 102.

After the pressure box 24 is pressed against the mold 26, differential pressure is applied to mold the heated sheet. The differential pressure attempts to elongate and blow out each gasket 110, 158 from its end plate slot. The bosses 118, 142 mechanically retain the gasket in the slot and resists elongation and blow-out of the gasket. Friction between the gasket and the slot walls also resists elongation of the gasket.

Figure 13:
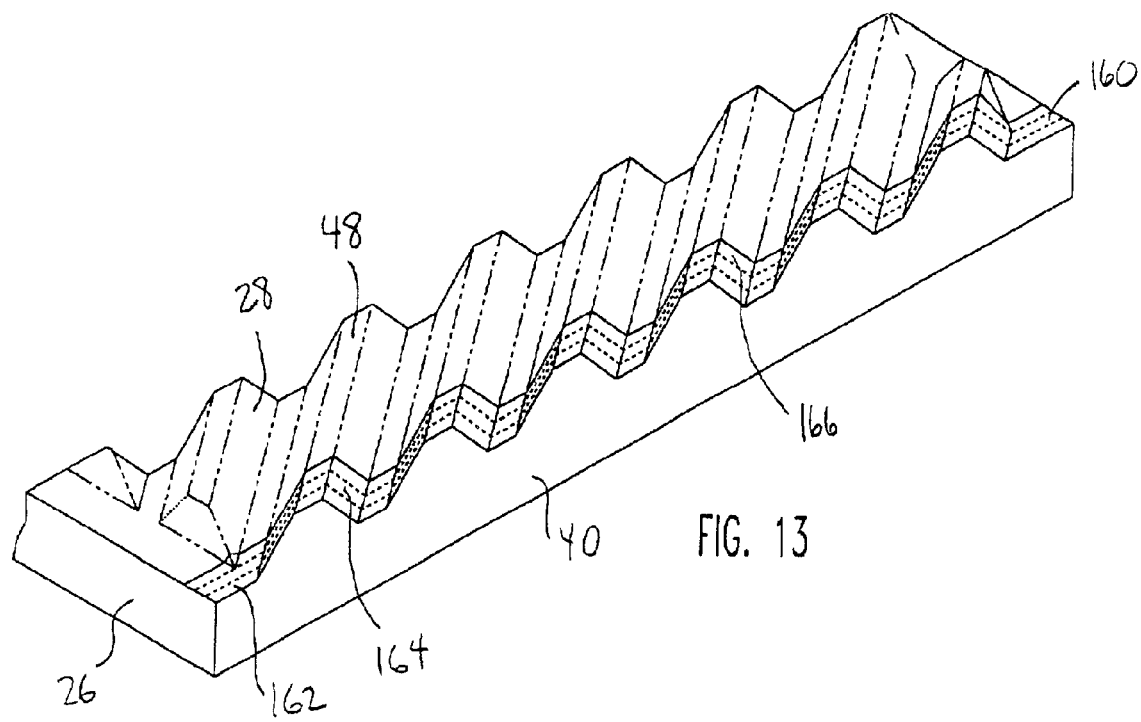
FIG. 13 is a partial sectional view of the downstream end of the mold shown in FIG. 2 and illustrating the three dimensional mold pattern of the mold that faces the end plate and gasket shown in FIG. 12.
Figure 14:
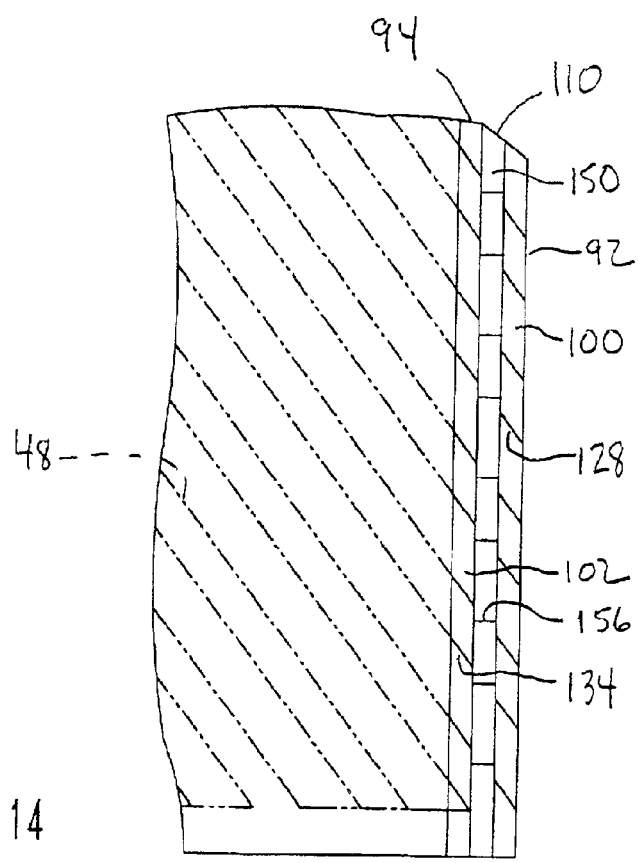
FIG. 14 is a schematic view looking down on the mold portion shown in FIG. 13 and illustrating the through-the-thickness contour of the end plate and gasket with respect to the three dimensional mold pattern.

Preferably the bottom surfaces 100, 102 of the end plate members are closely spaced above the gasket seal surface 150 when the pressure box 24 is pressed against the mold 26. This minimizes air leakage from the pressure chamber 84 should an air gap form along the gasket seal surface 150. FIGS. 13 and 14 illustrate how the three-dimensionally shaped segments 128 and 154 of the plate members 90, 92 are shaped to enable the bottom surfaces to be closely spaced from the seal surface 150.

As previously described with reference to FIG. 2, the male mold projections 48 extends at an acute angle θ with respect to the indexing direction. The angled orientation of the rows causes the shape of the upper face of the mold to vary along the length of the mold.

FIG. 13 illustrates a width 160 of the mold face 28 extending along the downstream end 40 of the mold 26. The width 160 includes an outer strip 162 facing the bottom of the first plate member 92, a center strip 164 facing the gasket 110 and an inner strip 166 facing the bottom of the second plate member 94. The strips are spaced along the length of the mold 26 and so each strip 162, 164 and 166 has a shape different from the other strips. The bottom surfaces of the plate members 92, 94 and the gasket 110 are each shaped to conform with a facing strip 162, 164 or 166 and so each bottom surface is shaped differently from the other surfaces.

The three-dimensionally shaped surfaces 128, 134 of the first and second plate members 92, 94 each extend through the thickness of the plate member at the angle θ with respect to the indexing axis. See FIG. 14, in which the relative orientation of the male projections 48 is indicated in phantom. This enables the surfaces 128, 134 of the plate member bottom surfaces 100, 102 to extend parallel with the male projections 48 and to be closely spaced from the projections when the pressure box is pressed against the mold. The lower ends of the plate members 92, 94 are each relatively thin, thus making it relatively easy to form the three-dimensionally shaped surfaces 128, 134.

After the plastic sheet 16 is molded to form molded sheet portion 32, the overpressure is relieved and the pressure box 24 separates from the mold 26. The gaskets 90, 110 and 158 relax and the gaskets 110 and 158 return to their unstressed shapes to begin a new operating cycle.

The gasket 110 is preferably laser cut from silicone rubber sheet in a conventional manner. The laser is preferably oriented perpendicular to the sheet for ease of manufacture. The laser cuts the seal surface 150 such that the surface extends through the thickness of the gasket 104 perpendicular to the faces of the sheet. The concave seal surfaces 156 are preferably cut to closely conform with the center of the facing mold strip 164 as shown in FIG. 14. The resiliency of the gasket 110 enables she gasket to conform to the shape of the strip 164 despite the sealing surface 150 being perpendicular co the faces of the sheet. In other possible embodiments the three dimensional seal surface 150 can be cut to extend through the thickness of the gasket 110 at the angle θ like the bottom surfaces of the plate members 92, 94.

The detachable mounting of the end plates to the side plates enables the pressure box 24 to be used with molds defining different mold patterns for seamless thermoforming. It is contemplated a molder may have an inventory of end walls for use with different molds.

The illustrated mold 26 has male mold projections. In other possible embodiments, the mold can include concave or female mold depressions that extend downwardly from a reference elevation. In such embodiments the end plates and their associated gaskets would include corresponding convex or male portions that are received in the female mold depressions.

In still other possible embodiments the end plates and the gaskets held in the end plates could have entirely flat, two-dimensional bottom surfaces to face flat mold surfaces.

It is also within the contemplation of the present invention that the side plates of the pressure box be constructed in like manner as the end plates 80 or 82. The side plates could be configured to conform with facing male, female or flat mold surfaces.

While I have illustrated and described a preferred embodiment of my invention, it is understood that this is capable of modification, and I therefore do not wish to be limited to the precise details set forth, but desire to avail myself of such changes and alterations as fall within the purview of the following claims.

I claim:

1. A pressure box for thermoforming a heated sheet of thermoforming material against a mold, the pressure box comprising:

a top plate, side and end plates extending downwardly below the top plate, the top plate and the side and end plates defining a pressure chamber open at the bottom of the pressure box, and a resilient circumferential seal on the bottom of the pressure box, the seal extending around the pressure chamber to form a seal when the pressure box is pressed against a heated sheet for thermoforming the sheet;

at least one of the said side and end plates comprising a pair of walls defining an essentially uniform width slot open at the lower end of such plate, the slot extending along the length of such plate;

a resilient sealing member in the slot, the sealing member extending downwardly below the lower end of such plate to an end surface below the lower end of such plate, the end surface forming a portion of the seal, the sealing member comprising a plurality of holes; and a first connection retaining the sealing member in the slot, the first connection comprising retaining members extending from one or both of the walls into the slot, the retaining members extending through the holes in the sealing member to engage the sealing member and resist movement of the sealing member out of the slot.

2. The pressure box of claim 1 wherein the sealing member comprises a pair of outer surfaces facing the walls of the slot, the outer surfaces separated by the thickness of the sealing member; and the thickness of the sealing member when unstressed is less than the width of the slot whereby the sealing member has a clearance fit between the walls of the slot when the pressure box is not pressed against the mold.

3. The pressure box of claim 2 wherein the outer surfaces of the sealing member contact the walls of the slot when the pressure box is pressed against the mold to seal the heated sheet.

4. The pressure box of claim 1 wherein the retaining members are spaced along the length of the slot.

5. The pressure box of claim 4 wherein the said at least one plate comprises first and second plate members and the pressure box further comprises a second connection joining the first and second plate members, the second connection comprising fasteners extending through bores in the retaining members.

6. The pressure box of claim 1 wherein the retaining members are spaced along a vertical axis.

7. The pressure box of claim 6 comprising a second connection attaching the said at least one plate to another of said side and end plates, the second connection comprising a plurality of fasteners joining the one plate and the other plate, the fasteners extending through bores in the retaining members.

8. The pressure box of claim 1 wherein each wall is on a respective lower end portion of the said at least one plate, each end portion having a bottom surface on the lower end of such plate, at least a portion of each bottom surface having a three-dimensional shape to conform with a corresponding three-dimensional shape of the mold.

9. The pressure box of claim 8 wherein the end surface of the sealing member comprises a three-dimensionally shaped portion disposed between the three-dimensionally shaped portions of the plate bottom surfaces.

10. The pressure box of claim 9 wherein the three-dimensional portion of the end surface of the sealing member is about 0.020 inches below the plate bottom surfaces.

11. The pressure box of claim 8 wherein the said at least one plate is transverse to an indexing axis and the three-dimensionally shaped portion of at least one of the plate bottom surfaces and the sealing member end surface is configured to conform with one or more male or female portions of the mold extending along an axis not parallel with the indexing axis.

12. The pressure box of claim 1 wherein the sealing member is a flat sheet of elastomeric material.

13. A pressure box for thermoforming a heated sheet of thermoforming material against a mold, the pressure box comprising:

a top plate, side and end plates extending downwardly below the top plate, the top plate and the side and end plates defining a pressure chamber open at the bottom of the pressure box, and a resilient circumferential seal on the bottom of the pressure box, the seal extending around the pressure chamber to form a seal when the pressure box is pressed against a heated sheet for thermoforming the sheet;

at least one of the said plates comprising first and second plate members, each plate member comprising a wall, the walls of the plate members facing each other and defining an essentially uniform width slot open at the lower end of such plate, the slot extending along the length of such plate;

a resilient sealing member in the slot, the sealing member immediately adjacent the slot walls wherein the walls constrain the sealing member when thermoforming a sheet, the sealing member extending downwardly below the lower end of such plate to an end surface below the lower end of such plate, the end surface forming a portion of the seal; and a first connection detachably holding the first and second plate members together, whereby the plate members can be separated for inserting the sealing member in the slot or removing the sealing member from the slot.

14. The pressure box of claim 13 comprising a second connection retaining the sealing member in the slot, the second connection comprising retaining members extending from one or both of the walls into the slot, the retaining members extending through holes in the sealing member to engage the sealing member and resist movement of the sealing member out of the slot; and each retaining member is integral with the first or second plate member.

15. The pressure box of claim 14 wherein each plate member and the retaining members integral with such plate member is a homogeneous one-piece member.

* * * * *